United States Patent
Wang et al.

(10) Patent No.: US 8,983,402 B2
(45) Date of Patent: Mar. 17, 2015

(54) TRANSCEIVER WITH WAKE UP DETECTION

(71) Applicant: National Sun Yat-Sen University, Kaohsiung (TW)

(72) Inventors: Chua-Chin Wang, Kaohsiung (TW); Chih-Lin Chen, Kaohsiung (TW); Jie-Jyun Li, Kaohsiung (TW); Gang-Neng Sung, Kaohsiung (TW); Tai-Hao Yeh, Kaohsiung (TW); Chun-Ying Juan, Kaohsiung (TW); Zong-You Hou, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 112 days.

(21) Appl. No.: 13/965,614

(22) Filed: Aug. 13, 2013

(65) Prior Publication Data
US 2015/0050897 A1   Feb. 19, 2015

(51) Int. Cl.
*H04B 1/38* (2006.01)
*H04W 52/02* (2009.01)
*H04B 1/40* (2006.01)

(52) U.S. Cl.
CPC ............. *H04W 52/0229* (2013.01); *H04B 1/40* (2013.01)
USPC ............................. 455/73; 713/320; 713/323

(58) Field of Classification Search
CPC .............................. H04B 1/40; H04W 52/0229
USPC ............ 455/73, 86, 88, 574, 333, 336, 343.1
See application file for complete search history.

(56) References Cited

U.S. PATENT DOCUMENTS

| | | | | |
|---|---|---|---|---|
| 5,887,176 A | * | 3/1999 | Griffith et al. | 713/320 |
| 6,895,226 B1 | * | 5/2005 | Forster et al. | 455/86 |
| 7,596,367 B2 | * | 9/2009 | Kawasaki | 455/343.2 |
| RE42,604 E | * | 8/2011 | Forster et al. | 455/86 |
| 8,041,973 B2 | * | 10/2011 | Smit et al. | 713/323 |
| 8,452,243 B2 | * | 5/2013 | Prikhodko et al. | 455/107 |
| 8,509,859 B2 | * | 8/2013 | Jarosinski et al. | 455/574 |
| 8,848,770 B2 | * | 9/2014 | Buescher et al. | 375/219 |
| 2006/0270381 A1 | * | 11/2006 | Park et al. | 455/343.2 |

OTHER PUBLICATIONS

Wang, Chua-Chin et al., A low-power transceiver design for FlexRay-based communication systems, Microelectronics Journal 44 (2013) 359-366, Nov. 27, 2012.

\* cited by examiner

*Primary Examiner* — Marceau Milord
(74) *Attorney, Agent, or Firm* — Jackson IPG PLLC

(57) ABSTRACT

A transceiver with wake up detection includes a primary control unit, a transmission unit and a receiving unit, the transmission unit comprises a first logic set, a second logic set, a third logic set, a first loop, and a second loop. The first loop outputs a first differential signal, and the second loop outputs a second differential signal. The receiving unit comprises a wake up detection circuit having a first comparator, a second comparator and a fourth logic set. When the first comparator and the second comparator receive a first predetermined level of the first differential signal and a second predetermined level of the second differential signal, the fourth logic set outputs an idle state signal and a data signal to the primary control unit to make an operation mode of the transceiver switched from a low power mode to a normal mode.

12 Claims, 4 Drawing Sheets

TRANSCEIVER WITH WAKE UP DETECTION

FIELD OF THE INVENTION

The present invention is generally related to a transceiver, which particularly relates to the transceiver with function of wake up detection.

BACKGROUND OF THE INVENTION

A conventional FlexRay transceiver includes a FlexRay transmitter and a FlexRay receiver, the FlexRay transmitter includes a current mirror and a transmission gate, and the FlexRay receiver includes a hysteresis comparator, a window comparator and a charge-discharge pump. The transmission gate determines whether the current mirror generates a current according to a state code so as to provide voltage signals to a bus. The hysteresis comparator is used for comparison between a first input voltage and a second input voltage, and an output signal is generated based on comparison result. The window comparator is in connection with the hysteresis comparator. When the first input voltage and the second input voltage is within a voltage range, the window comparator outputs an idle state signal. The charge-discharge pump is in connection with the window comparator. The charge-discharge pump is used to eliminate the noise of the idle state signal. However, the conventional FlexRay transceiver does not possess the function of over current detection, when the internal current of the transceiver is excessive, the transceiver is not able to detect the condition of over current therefore leading to damage. Besides, the conventional FlexRay transceiver does not possess the function of wake up detection. Once conventional FlexRay transceiver is applicable to FlexRay-based in-car communication system, the operation mode of the transceiver can not be switched flexibly between low power mode and normal mode. Therefore, additional power consumption is occurred.

SUMMARY

The primary object of the present invention is to provide a transceiver with function of wake up detection. A transmission unit of the transceiver transmits a first differential signal and a second differential signal to a wake up detection circuit, and the wake up detection circuit outputs signals to a primary control unit so as to make an operation mode of the transceiver switch from a low power mode to a normal mode.

A transceiver with wake up detection in the present invention applicable to in-car communication system based on FlexRay protocol includes a primary control unit, a transmission unit and a receiving unit. The primary control unit transmits a first transmission signal, a second transmission signal, a first idle signal and a second idle signal to the transmission unit. The transmission unit electrically connects to the primary control unit and comprises a first logic set, a second logic set, a third logic set, a first loop and a second loop, wherein the first logic set comprises a first logic gate and a second logic gate, the second logic set comprises a third logic gate and a fourth logic gate, the third logic set comprises a fifth logic gate and a sixth logic gate electrically connected to the fifth logic gate, the first loop comprises a first transistor and a second transistor, and the second loop comprises a third transistor and a fourth transistor. The first logic gate electrically connects to the first transistor, the second logic gate electrically connects to the fourth transistor, the third logic gate electrically connects to the third transistor, the fourth logic gate electrically connects to the second transistor, the first transistor electrically connects to the fourth transistor, and the second transistor electrically connects to the third transistor. The fifth logic gate receives the first idle signal and the second idle signal and outputs a first enabling signal, the sixth logic gate outputs a second enabling signal, the first logic gate and the third logic gate receive the second enabling signal, the second logic gate and the fourth logic gate receive the first enabling signal, the first logic set receives the first transmission signal, the second logic set receives the second transmission signal, the first loop enables to output a first differential signal, and the second loop enables to output a second differential signal. The receiving unit electrically connects to the primary control unit and the transmission unit. The receiving unit comprises a wake up detection circuit having a first comparator, a second comparator and a fourth logic set electrically connected to the first comparator and the second comparator. When the first comparator and the second comparator receive a first predetermined level of the first differential signal and a second predetermined level of the second differential signal, the fourth logic set outputs an idle state signal and a data signal respectively to the primary control unit therefore making the transceiver receive a wake up signal and switch the operation mode of the transceiver from the low power mode to the normal mode. In this invention, the operation mode of the transceiver enables to switch from the low power mode to the normal mode corresponded to various demands by the wake up detection circuit therefore lowering the power consumption.

DETAILED DESCRIPTION OF THE INVENTION

Figure 1:
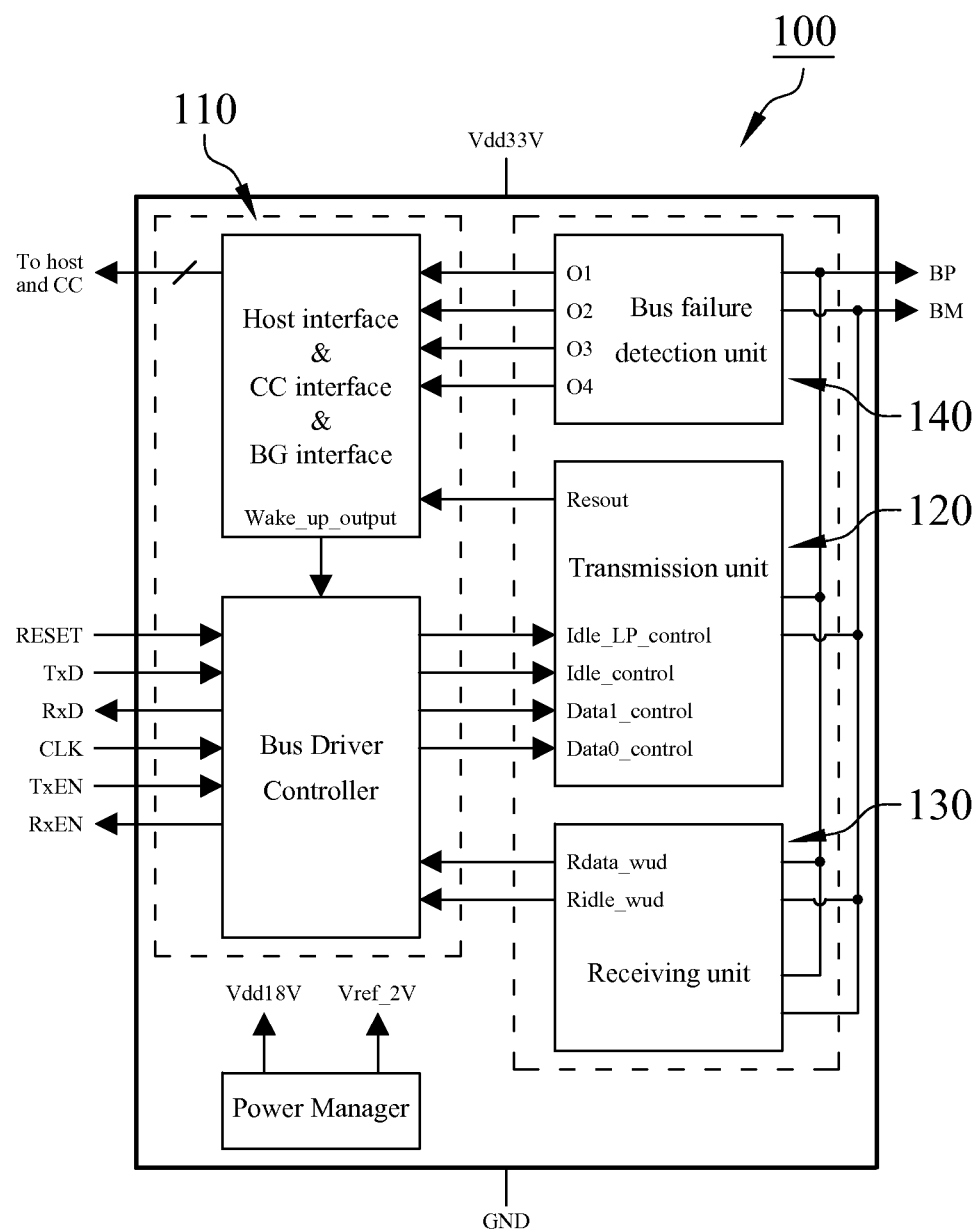
FIG. 1 is a schematic diagram illustrating a transceiver with wake up detection in accordance with an embodiment of the present invention.
Figure 2:
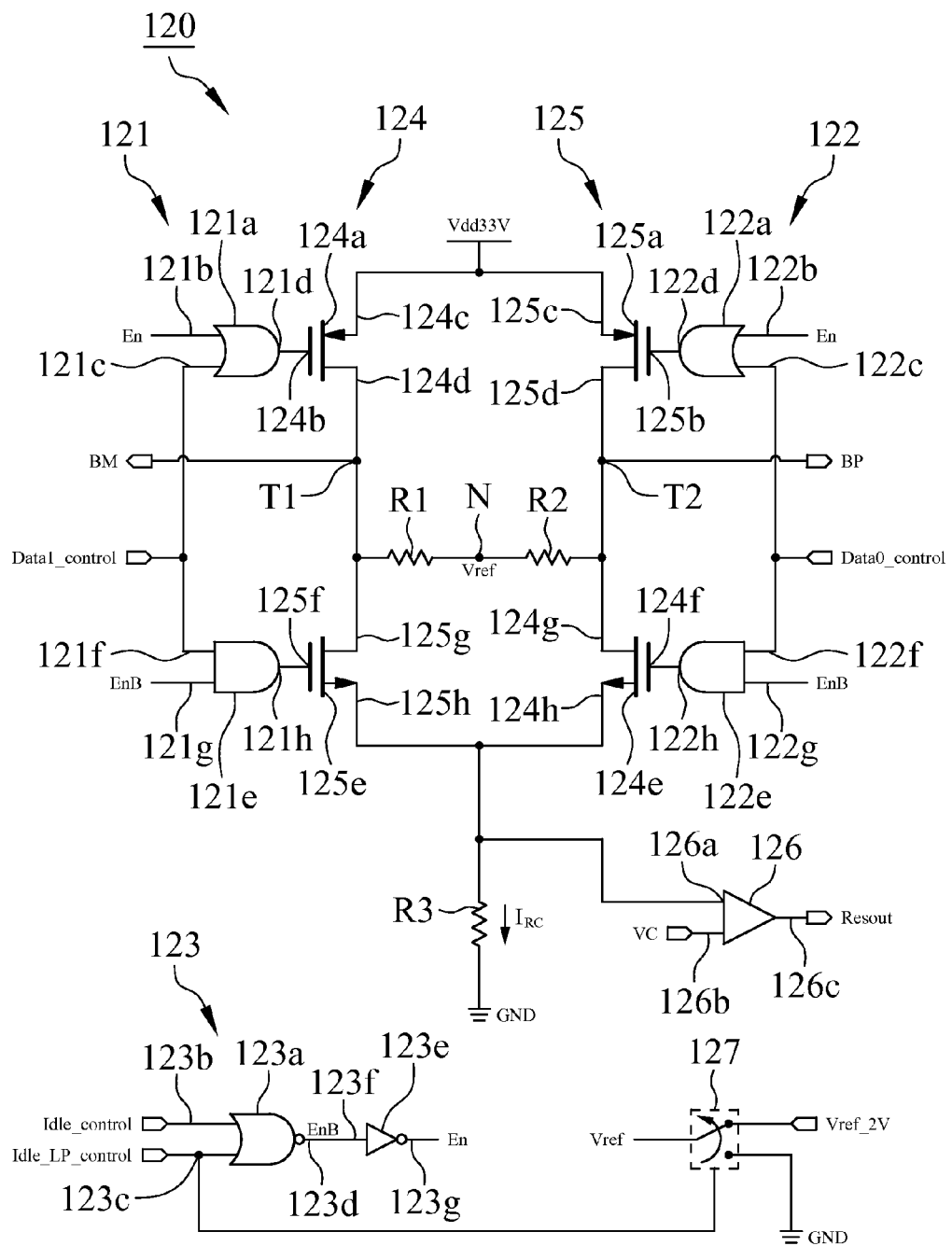
FIG. 2 is a circuitry illustrating a transmission unit of the transceiver with wake up detection in accordance with the embodiment of the present invention.
Figure 3:
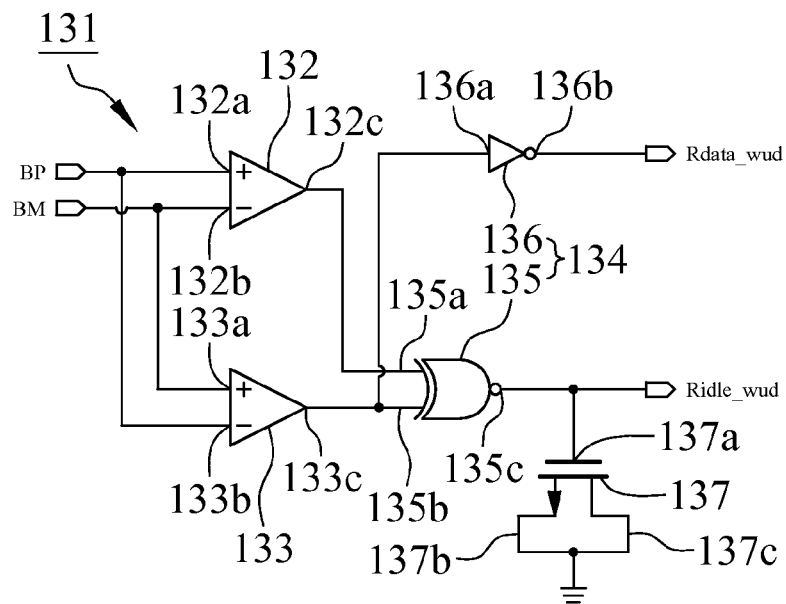
FIG. 3 is a circuitry illustrating a wake up detection circuit of a receiving unit of the transceiver wake up detection in accordance with the embodiment of the present invention.

With reference to FIGS. 1, 2 and 3, a transceiver 100 with wake up detection in accordance with an embodiment of the present invention is applicable to in-vehicle communication system based on FlexRay protocol. The transceiver 100 includes a primary control unit 110, a transmission unit 120 and a receiving unit 130, wherein the primary control unit 110 provides and transmits a first transmission signal, a second transmission signal, a first idle signal and a second idle signal to the transmission unit 120. The transmission unit 120 electrically connects to the primary control unit 110 and comprises a first logic set 121, a second logic set 122, a third logic set 123, a first loop 124 and a second loop 125, wherein the first logic set 121 comprises a firs logic gate 121a and a second logic gate 121e, the second logic set 122 comprises a third logic gate 122a and a fourth logic gate 122e, the third logic set 123 comprises a fifth logic gate 123a and a sixth logic gate 123e electrically connected to the fifth logic gate 123a, the first loop 124 comprises a first transistor 124a and a second transistor 124e, and the second loop 125 comprises a third transistor 125a and a fourth transistor 125e. The first logic gate 121a electrically connects to the first transistor 124a, the second logic gate 121e electrically connects to the fourth transistor 125e, the third logic gate 122a electrically connects to the third transistor 125a, the fourth logic gate 122e electrically connects to the second transistor 124e, the first transistor 124a electrically connects to the fourth transistor 125e, and the second transistor 124e electrically connects to the third transistor 125a. The fifth logic gate 123a of the third logic set 123 receives the first idle signal and the second idle signal from the primary control unit 110 and outputs a first enabling signal, the sixth logic gate 123e enables to output a second enabling signal, the second logic gate 121e and the fourth logic gate 122e enable to receive the first enabling signal from the fifth logic gate 123a, the first logic gate 121a and the third logic gate 122a enable to receive the second enabling signal from the sixth logic gate 123e, the first logic set 121 enables to receive the first transmission signal, the second logic set 122 enables to receive the second transmission signal, the first loop 124 enables to output a first differential signal BM, and the second loop 125 enables to output a second differential signal BP. The receiving unit 130 electrically connects to the primary control unit 110 and the transmission unit 120. The receiving unit 130 comprises a wake up detection circuit 131 having a first comparator 132, a second comparator 133 and a fourth logic set 134 electrically connected to the first comparator 132 and the second comparator 133. When the first comparator 132 and the second comparator 133 receive a first predetermined level of the first differential signal BM and a second predetermined level of the second differential signal BP as disclosed in FIG. 2, an idle state signal and a data signal outputted by the fourth logic set 134 transmit to the primary control unit 110 so as to make the transceiver 100 receiving a wake up signal and switching an operation mode of the transceiver 100 from a low power mode to a normal mode.

With reference to FIG. 2, a first input terminal 123b of the fifth logic gate 123a enables to receive the first idle signal, a second input terminal 123c of the fifth logic gate 123a enables to receive the second idle signal, an input terminal 123f of the sixth logic gate 123e electrically connects to an output terminal 123d of the fifth logic gate 123a, the first enabling signal is outputted by the output terminal 123d of the fifth logic gate 123a, and the second enabling signal is outputted by an output terminal 123g of the sixth logic gate 123e. A first input terminal 121b of the first logic gate 121a and a first input terminal 122b of the third logic gate 122a of the transmission unit 120 receive the second enabling signal, wherein a second input terminal 121g of the second logic gate 121e and a second input terminal 122g of the fourth logic gate 122e receive the first enabling signal, wherein a second input terminal 121c of the first logic gate 121a and a first input terminal 121f of the second logic gate 121e receive the first transmission signal simultaneously, wherein a second input terminal 122c of the third logic gate 122a and a first input terminal 122f of the fourth logic gate 122e receive the second transmission signal simultaneously. An output terminal 121d of the first logic gate 121a electrically connects to a gate electrode 124b of the first transistor 124a, an output terminal 121h of the second logic gate 121e electrically connects to a gate electrode 125f of the fourth transistor 125e, an output terminal 122d of the third logic gate 122a electrically connects to a gate electrode 125b of the third transistor 125a, and an output terminal 122h of the fourth logic gate 122e electrically connects to a gate electrode 124f of the second transistor 124e. In this embodiment, the first loop 124 is composed of a first transistor 124a, a first resistor R1, a second resistor R2, the second transistor 125e and a third resistor R3 in sequence, and the second loop 125 is composed of the third transistor 122a, the second resistor R2, the first resistor R1, the fourth transistor 124e and the third resistor R3 in sequence, and one end of the first resistor R1 electrically connects to one end of the second resistor R2. The first loop 124 further comprises a first signal output terminal T1, the second loop 125 further comprises a second signal output terminal T2, wherein a drain electrode 124d of the first transistor 124a, a drain electrode 125g of the fourth transistor 125e and another end of the first resistor R1 electrically connect to the first signal output terminal T1, and a drain electrode 125d of the third transistor 125a, a drain electrode 124g of the second transistor 124e and another end of the second resistor R2 electrically connects to the second signal output terminal T2. A source electrode 124c of the first transistor 124a and a source electrode 125c of the third transistor 125a electrically connect to a voltage source Vdd33V, and a source electrode 125h of the fourth transistor 125e and a source electrode 124h of the second transistor 124e electrically connect to one end of the third resistor R3. In this embodiment, the first logic gate 121a and the third logic gate 122a are OR gates, the second logic gate 121e and the fourth logic gate 122e are AND gates, the fifth logic gate 123a is a NOR gate, and the sixth logic gate 123e is a NOT gate.

With reference to FIG. 2, the transmission unit 120 further comprises a third comparator 126, wherein a first input terminal 126a of the third comparator 126 electrically connects to the source electrode 125h of the fourth transistor 125e, the source electrode 124h of the second transistor 124e and one end of the third resistor R3. When the current $I_{RC}$ passed through the third resistor R3 is excessive (Over current occurred when $I_{RC}$ is higher than 600 mA), the voltage level of the first input terminal 126a is higher than a second terminal 126b of the third comparator 126, and an output terminal 126c of the third comparator 126 outputs a high level signal to the primary control unit 110. When the primary control unit 110 receives the high level signal, the power offering the transceiver 100 is interrupted to prevent the transceiver 100 from damage. Besides, the transmission unit 120 further comprises a switch 127, wherein a node N is connected to one end of the first resistor R1 and one end of the second resistor R2, and the voltage level of the node N can be switched to Vref_2V or ground via the switch 127. When the voltage level is switched to Vref_2V, the operation mode of the transceiver 100 is an active mode or the normal mode (idle). When the voltage level is switched to ground, the operation mode of the transceiver 100 is the low power mode (idle_LP).

Figure 5:
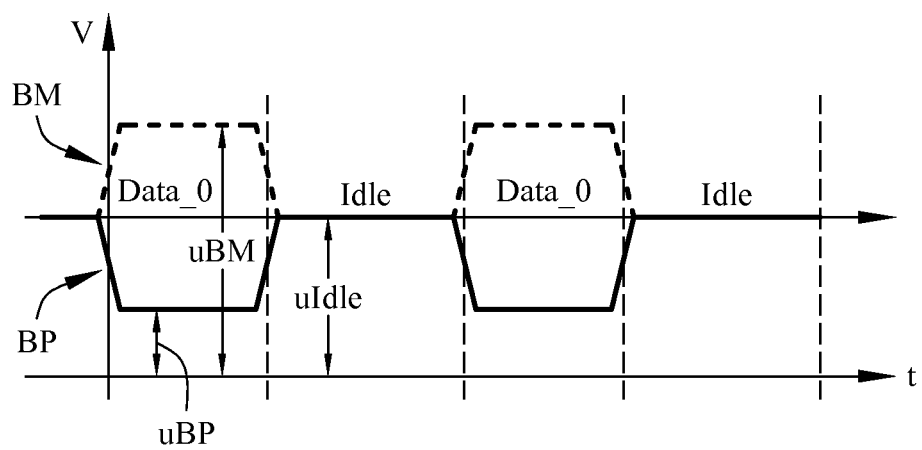
FIG. 5 is a curve diagram illustrating wake up pattern of the wake up detection circuit in accordance with the embodiment of the present invention.

With reference to FIGS. 2, 3 and 5, a negative terminal 132b of the first comparator 132 and a positive terminal 133a of the second comparator 133 receive the first differential signal BM from the first signal output terminal T1 of the first loop 124 simultaneously, and a positive terminal 132a of the first comparator 132 and a negative terminal 133b of the second comparator 133 receive the second differential signal BP from the second signal output terminal T2 of the second loop 125 simultaneously. The fourth logic set 134 comprises a seventh logic gate 135 and an eighth logic gate 136, a first input terminal 135a of the seventh logic gate 135 electrically connects to an output terminal 132c of the first comparator 132, and a second input terminal 135b of the seventh logic gate 135 electrically connects to an output terminal 133c of the second comparator 133 and an input terminal 136a of the eighth logic gate 136. When the voltage level of the first differential signal BM and the second differential signal BP meets the wake up pattern of FlexRay specification as illustrated in FIG. 5, an output terminal 135c of the seventh logic gate 135 outputs the idle state signal to the primary control unit 110, and an output terminal 136b of the eighth logic gate 136 also outputs the data signal to the primary control unit 110. Thereafter, the idle state signal and the data signal are transmitted to a communication controller (not shown in Figs.) via the primary control unit 110, and the communication controller (not shown in Figs.) examines the time length and mode that the wake up signal requires. After examination, the communication controller outputs the wake up signal to the transceiver 100 to make the operation mode of the transceiver switched from the low power mode to the normal mode. In addition, in this embodiment, the wake up detection circuit 131 further comprises a fifth transistor 137, wherein a gate electrode 137a of the fifth transistor 137 electrically connects to the output terminal 135c of the seventh logic gate 135, and a drain electrode 137c of the fifth transistor 137 electrically connects to a source electrode 137b of the fifth transistor 137. The fifth transistor 137 is utilized to be buffer capacitor for the output signal of the seventh logic gate 135. The seventh logic gate 135 is an exclusive OR gate, and the eighth logic gate 136 is a NOT gate. In this embodiment, the first predetermined level of the first differential signal BM and the second predetermined level of the second differential signal BP meet wake up pattern of FlexRay specification.

Figure 4:
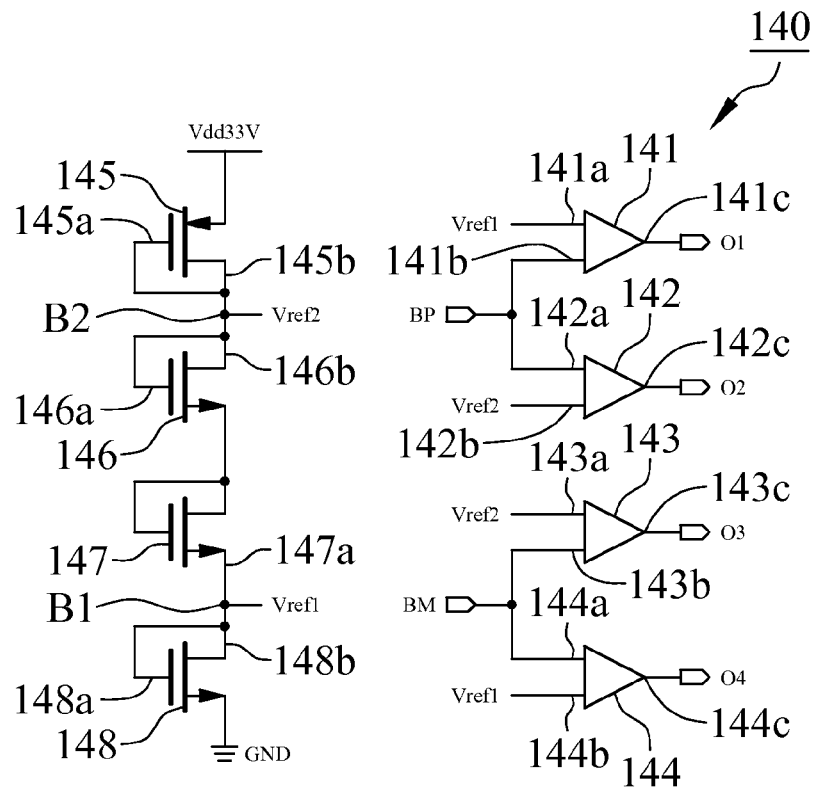
FIG. 4 is a circuitry illustrating a bus failure detection unit of the transceiver with wake up detection in accordance with the embodiment of the present invention.

With reference to FIGS. 2 and 4, the transceiver 100 further includes a bus failure detection unit 140 electrically connected to the primary control unit 110 and the transmission unit 120. The bus failure detection unit 140 enables to receive the first differential signal BM and the second differential signal BP and comprises a fourth comparator 141, a fifth comparator 142, a sixth comparator 143, a seventh comparator 144, a sixth transistor 145, a seventh transistor 146, an eighth transistor 147, a ninth transistor 148, a first bias terminal B1 and a second bias terminal B2. A second input terminal 141b of the fourth comparator 141 and a first input terminal 142a of the fifth comparator 142 receive the second differential signal BP simultaneously, and a second input terminal 143b of the sixth comparator 143 and a first input terminal 144a of the seventh comparator 144 receive a first differential signal BM simultaneously. A gate electrode 145a of the sixth transistor 145, a drain electrode 145b of the sixth transistor 145, a gate electrode 146a of the seventh transistor 146 and a drain electrode 146b of the seventh electrode 146 electrically connect to a second input terminal 142b of the fifth comparator 142 and a first input terminal 143a of the sixth comparator 143 via the second bias terminal B2. A source electrode 147a of the eighth transistor 147, a gate electrode 148a of the ninth transistor 148 and a drain electrode 148b of the ninth transistor 148 electrically connect to a first input terminal 141a of the fourth comparator 141 and a second input terminal 144b of the seventh comparator 144 via the first bias terminal B1. The first bias terminal B1 outputs a first bias voltage Vref1 to the fourth comparator 141 and the seventh comparator 144, and the second bias terminal B2 outputs a second bias voltage Vref2 to the fifth comparator 142 and the sixth comparator 143. The fourth comparator 141 and the seventh comparator 144 of the bus failure detection unit 140 are used for detecting whether the first differential signal BM and the second differential signal BP are short-circuited to ground. The fifth comparator 142 and the sixth comparator 143 are used for detecting whether the first differential signal BM and the second differential signal BP are short-circuited to Vdd33V. An output terminal 141 c of the fourth comparator 141 and an output terminal 144c of the seventh comparator 144 denote the fault that the first differential signal BM and the second differential signal BP are short-circuited to ground. An output terminal 142c of the fifth comparator 142 and an output terminal 143c of the sixth comparator 143 denote the fault that the first differential signal BM and the second differential signal BP are short-circuited to Vdd33V.

In this invention, by function of the wake up detection, the operation mode of the transceiver 100 enables to switch from the low power mode to the normal mode via the wake up detection circuit 131. The operation mode of the transceiver 100 can be switched in correspondence to various demands. Therefore, the power consumption is effectively reduced. In addition, the bus failure detection unit 140 is used to detect whether the first differential signal BM and the second differential signal BP are short-circuited to ground or Vdd33V. Otherwise, when the current $i_{RC}$ flew through the third resistor R3 is excessive, the third comparator 126 of the transmission unit 120 outputs a high level signal to the primary control unit 110. The primary control unit 110 receives the high level signal and makes the power offering the transceiver 100 fully interrupted in order to prevent the transceiver 100 from damage.

While this invention has been particularly illustrated and described in detail with respect to the preferred embodiments thereof, it will be clearly understood by those skilled in the art that it is not limited to the specific features and describes and various modifications and changes in form and details may be made without departing from the spirit and scope of this invention.

What is claimed is:

1. A transceiver with wake up detection includes:
 a primary control unit used for transmitting a first transmission signal, a second transmission signal, a first idle signal and a second idle signal;
 a transmission unit electrically connected to the primary control unit and having a first logic set, a second logic set, a third logic set, a first loop and a second loop, the first logic set comprises a first logic gate and a second logic gate, the second logic set comprises a third logic gate and a fourth logic gate, the third logic set comprises a fifth logic gate and a sixth logic gate electrically connected to the fifth logic gate, the first loop comprises a first transistor electrically connected to the first logic gate and a second transistor electrically connected to the fourth logic gate, the second loop comprises a third transistor electrically connected to the third logic gate and a fourth transistor electrically connected to the second logic gate, the first transistor electrically connects to the fourth transistor, the second transistor electrically connects to the third transistor, the fifth logic gate receives the first idle signal and the second idle signal and outputs a first enabling signal, the sixth logic gate outputs a second enabling signal, the first logic gate and the third logic gate receive the second enabling signal, the second logic gate and the fourth logic gate receive the first enabling signal, the first logic set receives the first transmission signal, the second logic set receives the second transmission signal, the first loop outputs a first differential signal, the second loop outputs a second differential signal; and
 a receiving unit electrically connected to the primary control unit and the transmission unit and having a wake up detection circuit, the wake up detection circuit comprises a first comparator, a second comparator and a fourth logic set electrically connected to the first comparator and the second comparator, when the first comparator and the second comparator receive a first predetermined level of the first differential signal and a second predetermined level of the second differential signal, the fourth logic gate set outputs an idle state signal and a data signal to the primary control unit to make the transceiver receiving a wake up signal and switching an operation mode of the transceiver from a low power mode to a normal mode.

2. The transceiver with wake up detection in accordance with claim 1 further includes a bus failure detection unit electrically connected to the primary control unit and the transmission unit, the bus failure detection unit comprises a fourth comparator, a fifth comparator, a sixth comparator and a seventh comparator, wherein a second input terminal of the fourth comparator and a first input terminal of the fifth comparator receive the first differential signal simultaneously, a second input terminal of the sixth comparator and a first input terminal of the seventh comparator receive the second differential signal simultaneously.

3. The transceiver with wake up detection in accordance with claim 2, wherein the bus failure detection unit further comprises a sixth transistor, a seventh transistor, an eighth transistor, a ninth transistor, a first bias terminal and a second bias terminal, wherein a gate electrode of the sixth transistor, a drain electrode of the sixth transistor, a gate electrode of the seventh transistor and a drain electrode of the seventh transistor electrically connect to the second input terminal of the fifth comparator and a first input terminal of the sixth comparator via the second bias terminal, wherein a source electrode of the eighth transistor, a gate electrode of the ninth transistor and a drain electrode of the ninth transistor electrically connect to a first input terminal of the fourth comparator and a second input terminal of the seventh comparator via the first bias terminal.

4. The transceiver with wake up detection in accordance with claim 1, wherein a negative terminal of the first comparator and a positive terminal of the second comparator receive the first differential signal from the first loop simultaneously, wherein a positive terminal of the first comparator and negative terminal of the second comparator receive the second differential signal from the second loop simultaneously.

5. The transceiver with wake up detection in accordance with claim 4, wherein the fourth logic set of the wake up detection circuit comprises a seventh logic gate and an eighth logic gate, wherein a first input terminal of the seventh logic gate electrically connects to an output terminal of the first comparator, wherein a second input terminal of the seventh logic gate electrically connects to an output terminal of the second comparator and an input terminal of the eighth logic gate, an output terminal of the seventh logic gate outputs the idle state signal, and an output terminal of the eighth logic gate outputs the data signal.

6. The transceiver with wake up detection in accordance with claim 5, wherein the wake up detection circuit further comprises a fifth transistor, a gate electrode of the fifth transistor electrically connects to the output terminal of the eighth logic gate, and a drain electrode of the fifth transistor electrically connects to a source electrode of the fifth transistor.

7. The transceiver with wake up detection in accordance with claim 1, wherein a first input terminal of the fifth logic gate receives the first idle signal from the primary control unit, a second input terminal of the fifth logic gate receives the second idle signal from the primary control unit, an input terminal of the sixth logic gate electrically connects to an output terminal of the fifth logic gate, the second enabling signal is outputted from the output terminal of the fifth logic gate, and the first enabling signal is outputted from an output terminal of the sixth logic gate.

8. The transceiver with wake up detection in accordance with claim 7, wherein a first input terminal of the first logic gate and a first input terminal of the third logic gate receive the second enabling signal from the sixth logic gate, wherein a second input terminal of the second logic gate and a second input terminal of the fourth logic gate receive the first enabling signal from the fifth logic gate, wherein a second input terminal of the first logic gate and a first input terminal of the second logic gate receive the first transmission signal from the primary control unit simultaneously, and a second input terminal of the third logic gate and a first input terminal of the fourth logic gate receive the second transmission signal from the primary control unit simultaneously.

9. The transceiver with wake up detection in accordance with claim 1, wherein the first loop further comprises a first signal output terminal, the second loop further comprises a second signal output signal, wherein a source electrode of the first transistor and a source electrode of the third transistor electrically connect to a voltage source, wherein a drain electrode of the first transistor and a drain electrode of the fourth transistor electrically connect to the first signal output terminal, wherein a drain electrode of the third transistor and a drain electrode of the second transistor electrically connect to the second signal output terminal, the first differential signal is outputted from the first signal output terminal, and the second differential signal is outputted from the second signal output terminal.

10. The transceiver with wake up detection in accordance with claim 9, wherein the first loop is composed of the first transistor, a first resistor, a second resistor, the second transistor and a third resistor, the second loop is composed of the third transistor, the second resistor, the first resistor, the fourth transistor and the third resistor, wherein one end of the first resistor electrically connects to one end of the second resistor, another end of the first resistor electrically connects to the drain electrode of the first transistor and the drain electrode of the fourth transistor, another end of the second resistor electrically connects to the drain electrode of the third transistor and the drain electrode of the second transistor.

11. The transceiver with wake up detection in accordance with claim 10, wherein the transmission unit further comprises a third comparator, a first input terminal of the third comparator electrically connects to a source electrode of the fourth transistor, a source electrode of the second transistor and one end of the third resistor.

12. The transceiver with wake up detection in accordance with claim 1, wherein an output terminal of the first logic gate electrically connects to a gate electrode of the first transistor, an output terminal of the second logic gate electrically connects to a gate electrode of the fourth transistor, an output terminal of the third logic gate electrically connects to a gate electrode of the third transistor, and an output terminal of the fourth logic gate electrically connects to a gate electrode of the second transistor.

* * * * *